US012568382B2

(12) United States Patent
Song et al.

(10) Patent No.: US 12,568,382 B2
(45) Date of Patent: Mar. 3, 2026

(54) DCI TRANSMISSION METHOD AND COMMUNICATION DEVICE

(71) Applicant: VIVO MOBILE COMMUNICATION CO., LTD., Chang'an Dongguan (CN)

(72) Inventors: Yang Song, Chang'an Dongguan (CN); Peng Sun, Chang'an Dongguan (CN); Zhi Lu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 361 days.

(21) Appl. No.: 17/586,341

(22) Filed: Jan. 27, 2022

(65) Prior Publication Data

US 2022/0150720 A1     May 12, 2022

Related U.S. Application Data

(63) Continuation of application No. PCT/CN2020/103309, filed on Jul. 21, 2020.

(30) Foreign Application Priority Data

Jul. 30, 2019     (CN) .......................... 201910696683.1

(51) Int. Cl.
*H04W 16/28*     (2009.01)
*H04W 72/0453*     (2023.01)
*H04W 72/23*     (2023.01)

(52) U.S. Cl.
CPC ....... *H04W 16/28* (2013.01); *H04W 72/0453* (2013.01); *H04W 72/23* (2023.01)

(58) Field of Classification Search
None
See application file for complete search history.

(56) References Cited

U.S. PATENT DOCUMENTS

2008/0227398 A1* 9/2008 Haghighat ............ H04W 28/06
455/63.1
2014/0036813 A1* 2/2014 Lunttila ................ H04W 72/21
370/329
(Continued)

FOREIGN PATENT DOCUMENTS

CN     106851744 A     6/2017
CN     107371252 A     11/2017
(Continued)

OTHER PUBLICATIONS

NEC, "Discussion on multi-TRP operation", Apr. 2019, 3GPP R1-1904663, pp. 1-6.*
(Continued)

*Primary Examiner* — Adnan Baig
(74) *Attorney, Agent, or Firm* — BROOKS KUSHMAN P.C.

(57)     ABSTRACT

A DCI transmission method and a communication device are provided. The method includes: performing a transmission of DCI, wherein the DCI includes FDRA information, the FDRA information is used to determine N frequency domain resource groups, the N frequency domain resource groups are N groups of frequency domain resources used by the communication device for a PDSCH transmission, the N frequency domain resource groups respectively correspond to N spatial information indications, and N is an integer which is greater than or equal to 2.

7 Claims, 2 Drawing Sheets

12

Network device

11

Terminal

(56) References Cited

U.S. PATENT DOCUMENTS

| | | | | |
|---|---|---|---|---|
| 2014/0328302 | A1* | 11/2014 | Park | H04W 72/23 |
| | | | | 370/329 |
| 2016/0233994 | A1* | 8/2016 | Prasad | H04W 24/02 |
| 2017/0289733 | A1 | 10/2017 | Rajagopal et al. | |
| 2018/0279281 | A1 | 9/2018 | Li et al. | |
| 2019/0190572 | A1* | 6/2019 | Osawa | H04W 72/23 |
| 2019/0215809 | A1* | 7/2019 | Yang | H04L 25/0204 |
| 2020/0021404 | A1 | 1/2020 | Qin et al. | |
| 2020/0059912 | A1 | 2/2020 | Shen et al. | |
| 2020/0213069 | A1 | 7/2020 | Jiang et al. | |
| 2020/0221428 | A1 | 7/2020 | Moon et al. | |
| 2020/0374093 | A1 | 11/2020 | Song et al. | |
| 2020/0403749 | A1* | 12/2020 | Park | H04L 5/0048 |
| 2021/0014727 | A1* | 1/2021 | Wang | H04B 17/336 |
| 2021/0235453 | A1* | 7/2021 | Matsumura | H04W 80/02 |
| 2021/0298056 | A1* | 9/2021 | Fu | H04W 72/0453 |
| 2022/0345245 | A1* | 10/2022 | Yuan | H04L 5/0023 |
| 2022/0360384 | A1* | 11/2022 | Takahashi | H04L 5/0094 |

FOREIGN PATENT DOCUMENTS

| | | |
|---|---|---|
| CN | 108633055 A | 10/2018 |
| CN | 108809505 A | 11/2018 |
| CN | 109309550 A | 2/2019 |
| CN | 110035546 A | 7/2019 |
| KR | 20170093590 A | 8/2017 |
| KR | 20190017675 A | 2/2019 |
| WO | 2019/051242 A2 | 3/2019 |
| WO | 2019063788 A1 | 4/2019 |
| WO | 2020194269 A1 | 10/2020 |

OTHER PUBLICATIONS

European Search Report dated Aug. 5, 2022 as received in application No. 20847832.1.

"Technical Specification Group Radio Access Network" 3GPP TS 36.213, Evolved Universal Terrestrial Radio Access, Jun. 2019.
"Summary of AI: 7.2.8.2. Enhancements on Multi-TRP/Panel Transmission of Offline Discussion" 3GPP TSG RAN WG1 Meeting #96, R1-190abcd. Feb. 25, 2019, Huawei.
"Discussion on multi-TRP operation" 3GPP TSG RAN WG1 #96bis, R1-1904663, Apr. 8, 2019, NEC.
Chinese office Action dated Jun. 3, 2021 as received in application No. 201910696683.1.
Indian Office Action dated Jul. 13, 2022 as received in application No. 202227010135.
International Search Report and Written Opinion date Oct. 16, 2020 as received in application No. PCT/CN2020103309.
Vivo, "Further Discussion on Multi-TRP Transmission" 3GPP TSG RAN WG1 #96bis, R1-1904096, Apr. 8, 2019.
Huawei, HiSilicon, "Summary of Evaluation Results for Multi-TRP transmission with Enhanced Reliability" 3GPP TSG RAN WG1 meeting #96b, R1-1907707, May 13, 2019.
First Office Action for Singapore Application No. 11202200879X, dated Apr. 8, 2024, 9 Pages.
Huawei, HiSilicon "Evaluation results for multi TRP panel transmission" 3GPP TSG RAN WG1 Meeting #97, Reno, USA, May 2019, R1-1906036, 12 Pages.
ZTE "Enhancements on Multi-TRP and Multi-panel Transmission" 3GPP TSG RAN WG1 #97, Reno, USA, May 2019, R1-1906236, 14 Pages.
First Office Action for Korean Application No. 10-2022-7006640, dated Sep. 6, 2024, 6 Pages.
Panasonic "On multi-TRP enhancements for NR MIMO in Rel. 16" 3GPP TSG RAN WG1 #96bis, Xi'an, China, Apr. 2019, R1-1904190, 13 Pages.
Second European Office Action for European Patent Application No. 20847832.1 mailed Jul. 10, 2025. 7 pages.
3rd Generation Partnership Project Technical Specification Group Radio Access Network; NR. Physical layer procedures for data (Release 15). 3GPP TS 38.214 V15.6.0. Online. Jun. 2019. 105 pages.

* cited by examiner

DCI TRANSMISSION METHOD AND COMMUNICATION DEVICE

CROSS-REFERENCE TO RELATED APPLICATION

The present application is continuation application of PCT International Application No. PCT/CN2020/103309 filed on Jul. 21, 2020, which claims priority to Chinese Patent Application No. 201910696683.1 filed in China on Jul. 30, 2019, the disclosures of which are incorporated herein by reference in their entireties.

TECHNICAL FIELD

The present disclosure relates to the technical field of communication, and in particular, to a downlink control information (DCI) transmission method and a communication device.

BACKGROUND

Some communication systems (for example: 5G communication systems) introduce a multi-transmission reception point (TRP) transmission technology. However, because the DCI transmitted by the network device on the physical downlink control channel (PDCCH) only supports the configuration of one frequency domain resource group, the current communication system cannot support multi-TRP transmission in a frequency division multiplexing (FDM) mode

SUMMARY

Embodiments of the present disclosure provide a DCI transmission method and a communication device.

According to a first aspect, embodiments of the present disclosure provide a DCI transmission method, applied to a communication device and including:

performing a transmission of DCI, wherein the DCI includes frequency domain resource allocation (FDRA) information, the FDRA information is used to determine N frequency domain resource groups, the N frequency domain resource groups are N groups of frequency domain resources used by the communication device for a physical downlink shared channel (PDSCH) transmission, the N frequency domain resource groups respectively correspond to N spatial information indications, and N is an integer which is greater than or equal to 2.

According to a second aspect, embodiments of the present disclosure provide a communication device, including:

a transmission module, configured to transmit DCI, wherein the DCI includes FDRA information, the FDRA information is used to determine N frequency domain resource groups, the N frequency domain resource groups are N groups of frequency domain resources used by the communication device for a PDSCH transmission, the N frequency domain resource groups respectively correspond to N spatial information indications, and N is an integer which is greater than or equal to 2.

According to a third aspect, embodiments of the present disclosure provide a communication device, including: a memory, a processor, and a program stored in the memory and capable of running on the processor, wherein when the program is executed by the processor, steps of the DCI transmission method provided by the embodiments of the present disclosure are implemented.

According to a fourth aspect, embodiments of the present disclosure provide a computer readable storage medium, wherein the computer readable storage medium stores a computer program; and when the computer program is executed by a processor, steps of the DCI transmission method provided by the embodiments of the present disclosure are implemented.

DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application are intended to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. A DCI method and a communication device provided in the embodiments of the present disclosure may be applied to a wireless communication system. The wireless communication system may be a 5G system, or an evolved long term evolution (eLTE) system or a long term evolution (LTE) system, or a subsequent evolution communication system, or the like.

Figure 1:
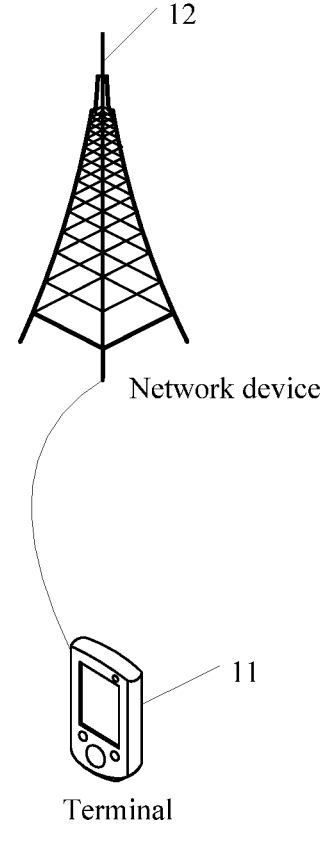
FIG. 1 is a structural diagram of a network system applicable to an embodiment of the present disclosure.

Referring to FIG. 1, FIG. 1 is a structural diagram of a network system applicable to an embodiment of the present disclosure. As shown in FIG. 1, the network system includes: a terminal 11 and a network device 12, wherein the terminal 11 may be user equipment (UE) or other terminal side devices, for example: a mobile phone, a tablet personal computer, a laptop computer, a personal digital assistant (PDA), a mobile Internet device (MID), a wearable device or a robot. It should be noted that a specific type of the terminal 11 is not limited in the embodiment of the present disclosure. The above-mentioned network device 12 may be a 4G base station, or a 5G base station, or a later version base station, or a base station in other communication systems, or called as a node B, an evolved Node B, or a transmission reception point (TRP), Or access point (AP), or other vocabulary in the field. As long as the same technical effect is achieved, the network device is not limited to a specific technical vocabulary. In addition, the network device 12 may be a master node (MN) or a secondary node (SN). It should be noted that in embodiments of the present disclosure, only the 5G base station is used as an example, but a specific type of the network device is not limited.

It should be noted that the communication device in the embodiment of the present disclosure may be a terminal or a network device. In the embodiment of the present invention, the terminal is mainly used for illustration.

Figure 2:
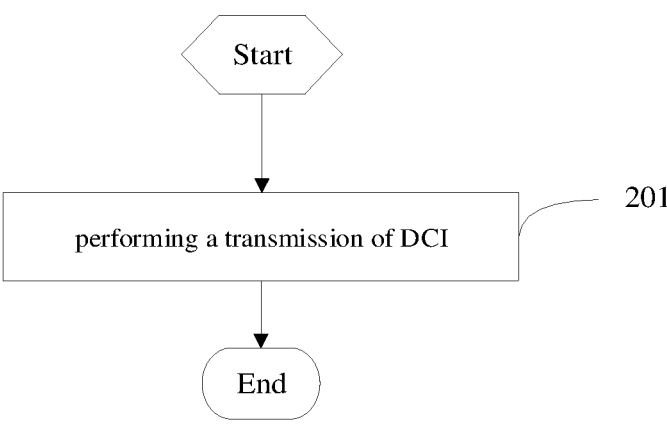
FIG. 2 is a flowchart of a DCI transmission method according to an embodiment of the present disclosure.

Referring to FIG. 2, FIG. 2 is a flowchart of a DCI transmission method according to an embodiment of the present disclosure. The method is applied to a communication device. As shown in FIG. 2, the method includes the following step:

step 201: performing a transmission of DCI, wherein the DCI includes FDRA information, the FDRA information is used to determine N frequency domain resource groups, the N frequency domain resource groups are the N groups of frequency domain resources used by the communication device to transmit PDSCH, the N frequency domain resource groups respectively correspond to N spatial information indications, and N is an integer which is greater than or equal to 2.

In a case that the communication device is a terminal, the DCI transmission may be receiving DCI; and in a case that the communication device is a network device, the DCI transmission may be transmitting DCI.

That the foregoing FDRA information is used to determine the N frequency domain resource groups may be that the communication device may determine the frequency domain resources of the foregoing N frequency domain resource groups according to the FDRA information. For example: the above FDRA information respectively indicates the frequency domain resources of the above N frequency domain resource groups; or, the above FDRA information indicates the frequency domain resources of part of frequency domain resource groups in the above N frequency domain resource groups, and the frequency domain resources of the remaining frequency domain groups may be determined by deducing the frequency domain resources of the indicated frequency domain resource groups; or the above FDRA information indicates all frequency domain resources corresponding to the above N frequency domain resource groups, and the communication device may divide these frequency domain resources into the above N frequency domain resource groups according to a preset rule.

That the above N frequency domain resource groups are the N groups of frequency domain resources used by the communication device to transmit the PDSCH may be that the frequency domain resources in these frequency domain resource groups are allocated by the network device to the terminal for PDSCH transmission.

That the N frequency domain resource groups respectively correspond to the N spatial information indications may be that different frequency domain resource groups correspond to different spatial information indications, that is, the frequency domain resource group and the spatial information indication are in a one-to-one correspondence to realize that different spatial information states correspond to different frequency domain resources. For example: different frequency domain resource groups correspond to different TCIs, so that different TCI states correspond to different frequency domain resources. It should be noted that the above spatial information indication is not limited to TCI. For example, it may also be an identifier used to identify TRP, so as to realize that different TRPs correspond to different frequency domain resource groups.

It should be noted that in the embodiment of the present disclosure, different TRPs may correspond to different spatial information indications, so that the above N frequency domain resource groups may correspond to N TRPs, that is, each frequency domain resource group corresponds to the frequency domain of one TRP.

In addition, in the embodiment of the present disclosure, the frequency domain resource group may include one or more frequency domain resources, and the number of frequency domain resources included in different frequency domain resource groups may be the same or different, which is not limited.

In addition, the frequency domain resource may be a resource block group (RBG), a virtual resource block (VRB), or a physical resource block (PRB). The frequency domain resource group indicated by the FDRA information in the embodiment of the present disclosure may also be suitable for two frequency domain resource allocation types supported by a Rel-15 protocol: type 0 and type 1. Of course, it is not limited to this, and may be applied to the frequency domain resource allocation type newly introduced in subsequent protocol versions.

In the embodiment of the present disclosure, through the above steps, it is possible to configure N frequency domain resource groups respectively corresponding to the N spatial information indications, thereby supporting multi-TRP transmission in the FDM mode.

Further, in the embodiment of the present disclosure, the above-mentioned communication device may also perform PDSCH transmission in the above-mentioned N frequency domain resource groups according to their respective corresponding spatial information indication (for example, TCI) states, so as to realize multi-TRP transmission in the FDM mode.

It should be noted that, in the embodiment of the present disclosure, the PDSCH transmission mode may include an FDM transmission scheme 2, wherein in the above-mentioned FDM transmission mode, the same time domain resources (for example, multiple orthogonal frequency division multiplexing (OFDM) symbols) may indicate N spatial information indication (for example: TCI) states and transmit multiple transmission occasions. There is no overlap in frequency domain resources between the transmission occasions. For example, each frequency domain resource without overlap is associated with a spatial information indication state, and/or all frequency domain resources without overlap are associated with the same one or more demodulation reference signal (DMRS) ports. Moreover, in one implementation scheme 2a, all frequency domain resource transmissions use the same redundancy version (RV) single-encoding codeword, or in another implementation scheme 2b, each transmission of non-overlapping frequency domain resources uses an RV single-encoding codeword, and the RV corresponding to each non-overlapping frequency domain resource may be the same or different.

Of course, in the embodiment of the present invention, the PDSCH transmission mode is not limited. For example, the PDSCH transmission mode may also be a combination of the FDM transmission scheme 2a or scheme 2b and a time division multiplexing (TDM) transmission scheme (for example, scheme 3 or scheme 4).

As an optional implementation manner, the FDRA information is one FDRA field and indicates K frequency domain resources; the K frequency domain resources are divided into M frequency domain resource groups; and K is an integer which is greater than or equal to N, and M is an integer which is greater than or equal to 1 and which is less than or equal to N.

In this implementation manner, it is possible to use an FDRA field in the DCI to indicate the frequency domain resource used by the PDSCH of the communication device, for example, to indicate the frequency domain resource used by the PDSCH of a terminal scheduled by the DCI. For example, there are a total of K RBGs, VRBs or PRGs in the frequency domain resources indicated by the FDRA field, which are divided into N frequency domain resource groups, and each frequency domain resource group corresponds to a spatial information indication (for example, TCI).

In addition, the corresponding relationship between the frequency domain resource group and the spatial information indication may be a one-to-one corresponding relationship between the default spatial information indication and the frequency domain resource group, pre-configured, or a corresponding relationship between the spatial information indication which is pre-configured or configured by signaling and the frequency domain resource group.

In this implementation manner, since one FDRA field is used to indicate, it is unnecessary to increase the overhead of the DCI, and it is unnecessary to modify the information field of the DCI.

Optionally, the K frequency domain resources are divided into the M frequency domain resource groups in a continuous or non-continuous manner according to a first proportion.

The above first proportion may be the proportion of the frequency domain resources of part of frequency domain resource groups in the M frequency domain resources in the K frequency domain resource groups, and the number of the frequency domain resources included in this part of frequency domain resource groups may be the same; or the first proportion may be the proportion of the frequency domain resources of the frequency domain resource group with the most frequency domain resources among the M frequency domain resource groups in the K frequency domain resources; or the first proportion may include the proportion of the frequency domain resources of each frequency domain resource group in the M frequency domain resource groups in the K frequency domain resources, and the number of the frequency domain resources included in different frequency domain resource groups may be the same or different. For example: M frequency domain resource groups include a first frequency domain resource group and a second frequency domain resource group 2, that is, M is equal to 2. The above-mentioned first proportion is an even distribution, that is, 1/M, K is equal to 10, then the first frequency domain resource group may include 5 frequency domain resources, and the second frequency domain resource group may include 5 frequency domain resources.

When the number of frequency domain resources of any frequency domain resource group calculated according to the first proportion is not an integer, it is also necessary to round the number of frequency domain resources obtained by calculation (including rounding up or rounding down). For example: M frequency domain resource groups include a first frequency domain resource group and a second frequency domain resource group, and the above-mentioned first proportion is that the number of frequency domain resources of the first frequency domain resource group is 1/4 of the K frequency domain resources, and the number of the frequency domain resources of the second frequency domain resource group is 3/4 of the K frequency domain resources. In a case that the number of the frequency domain resources of any frequency domain resource group obtained by calculation is not an integer, the number of frequency domain resources of the frequency domain resource group obtained by calculation is rounded up, and the number of frequency domain resources of the last frequency domain resource group is the number of frequency domain resources remaining after K frequency domain resources are allocated to other frequency domain resource groups. In a case that K is equal to 10, the first frequency domain resource group may include 3 frequency domain resources, and the second frequency domain resource group may include 7 frequency domain resources.

In addition, the above-mentioned first proportion may be default, pre-configured or configured by signaling, for example: radio resource control (RRC) signaling or a media access control control element (MAC CE) or DCI indicates that each frequency domain resource group uses the proportion of all frequency domain resources indicated by the FDRA field.

Of course, the above-mentioned first proportion may also be the proportion of the number of frequency domain resources among the M frequency domain resource groups. For example, the M frequency domain resource groups include a first frequency domain resource group and a second frequency domain resource group, then the first proportion includes the proportion between the number of frequency domain resources included in the first frequency domain resource group and the number of frequency domain resources included in the second frequency domain resource group.

The above division into the M frequency domain resource groups in a continuous or discontinuous manner may be that the frequency domain resources in the frequency domain resource group may be continuous or discontinuous among the indicated K frequency domain resources. Taking the case where the proportion of each frequency domain resource group in the K frequency domain resources is the same and is 1/3 as an example, K is equal to 9, then the first three of the above K frequency domain resources may be divided into the first frequency domain resource group, the middle three are divided into the second frequency domain resource group, and the last three are divided into the third frequency domain resource group; or the nine frequency domain resources are divided into the first frequency domain resource groups, the second frequency domain resource groups and the third frequency domain resource groups sequentially in turns, that is, the nine frequency domain resources are divided into the first frequency domain resource group, the second frequency domain resource group, the third frequency domain resource group, the first frequency domain resource group, the second frequency domain resource group, the third frequency domain resource group, the first frequency domain resource group, the second frequency domain resource group and the third frequency domain resource group sequentially.

In this implementation manner, since the K frequency domain resources are divided into the M frequency domain resource groups in a continuous or non-continuous manner according to the first proportion, it is unnecessary to indicate the frequency domain resources of each frequency domain resource group, thereby saving the overhead of DCI.

Optionally, when M is less than N, the frequency domain resources of the remaining N-M frequency domain resource groups are determined according to the frequency domain resources and configuration information of the M frequency domain resource groups indicated by the FDRA information.

In this implementation manner, the FDRA field may indicate the frequency domain resources used by part of the frequency domain resource groups (for example, a frequency domain resource group), and the frequency domain resources and other configuration information used by this part of the frequency domain resource groups may be derived to obtain the frequency domain resources used by the remaining frequency domain resource groups.

For example: the configuration information may be used to configure an offset between frequency domain resource groups, and the configuration information is configured on a network side or agreed by a protocol. Specifically, RRC configures the offset in one frequency domain resource group, or RRC configures the offset between a plurality of frequency domain resource groups, which is indicated by MAC CE or DCI, or the offset between one of the default frequency domain resource groups.

Take the case where N=2 frequency domain resource groups, and the FDRA field indicates frequency domain resources used by M=1 frequency domain resource group as an example.

When the FDRA is type 0, it is assumed that there are a total of 12 RBGs (RBG0, 1, 2, . . . , 11) on an activated bandwidth part (BWP), and the FDRA field of DCI has a total of 12 bits. Assuming the configuration information is that the offset between the i-th frequency-domain resource of the second frequency-domain resource group and the i-th frequency-domain resource of the first frequency-domain resource group is 1 RBG, and 12 bits in the FDRA field of DCI indicate the RBG number (0010 0100 0100) used by the first frequency domain resource group, that is, the first frequency domain resource group uses RBG2, 5, and 9, then the second frequency domain resource group uses RBG3, 6, 10; assuming the configuration information is the frequency domain resources used by the second frequency domain resource group are offset by 1 RBG as a whole from the frequency domain resources used by the first frequency domain resource group. In a case that 12 bits in the FDRA field of DCI indicate the RBG number (011001000000) used by the first frequency domain resource group, that is, the first frequency domain resource group uses RBG1, 2, 5, then the second frequency domain resource group uses RBG6, 7, 10.

When FDRA is type 1, the FDRA field of DCI indicates the starting VRB number and length of the first frequency domain resource group. Assuming the configuration information is the frequency domain resource used by the second frequency domain resource group is offset by 1 RBG as a whole from the frequency domain resources used by the first frequency domain resource group. In a case that the terminal determines that the VRB used by the first frequency domain resource group is VRB8 to VRB16, the second frequency domain resource group uses VRB17 to VRB25.

Of course, in the embodiment of the present disclosure, it is limited to determine the frequency domain resources of the frequency domain resource group through the above two optional methods. For example: the division of K frequency domain resources into M frequency domain resource groups may be based on a rule determined through default, pre-configuration or signaling configuration. The rule may be any one of the following:

according to the order of the frequency domain resource groups, the frequency domain resources are divided into the corresponding frequency domain resource groups sequentially; or the frequency domain resources are averagely group; or the number of the frequency domain resources included in part of the frequency domain resource groups is the same.

In the case that the frequency domain resources are sequentially divided into the corresponding frequency domain resource groups according to the order of the frequency domain resource groups, the frequency domain resources in the frequency domain resource group is non-continuous. For example, in the K frequency domain resources indicated by the FDRA field, RBG/VRB/PRG correspond to different frequency domain resource groups sequentially.

When the FDRA of PDSCH is type 0, the case where the RBGs correspond to two frequency domain resource groups sequentially in turn is taken as an example. Assuming that there are a total of 12 RBGs (RBG0, 1, 2, . . . , 11) in one BWP, and the FDRA field of DCI totally has 12 bits, namely 0011 0110 0111, that is, the scheduled PDSCH uses RBG2, 3, 5, 6, 9, 10, 11. Then RBG2 belongs to the first frequency domain resource group, RBG3 belongs to the second frequency domain resource group, RBG5 belongs to the first frequency domain resource group, RBG6 belongs to the second frequency domain resource group, and so on. When the number of allocated RBGs is an odd number, the number of RBGs included in the two frequency domain resource groups are not equal; otherwise, they are equal.

When the FDRA of PDSCH is type 0, the case where the PRGs correspond to two frequency domain resource groups sequentially in turn is taken as an example. Assuming that there are a total of 12 RBGs (RBG0, 1, 2, . . . , 11) in one BWP, and the FDRA field of DCI totally has 12 bits, namely 0011 0110 0111, that is, the scheduled PDSCH uses RBG2, 3, 5, 6, 9, 10, 11. Assuming that the RBG size is 4 PRBs and the PRG size is 2 PRBs, then one RBG may include 2 PRGs. In this way, the first PRG in each RBG belongs to the first frequency domain resource group, and the second PRG belongs to the second frequency domain resource group.

The above-mentioned frequency domain resources are averagely grouped, or the number of the frequency domain resources included in part of the frequency domain resource groups is the same, which may be understood that the K frequency domain resources indicated by the FDRA field are divided into N sections of frequency domain resources. Each section of frequency domain resources has one frequency domain resource group. The division method may default to the average grouping or approximate average of the frequency domain resources. For example: N−1 frequency domain resource groups include [K/N] frequency domain resources, and one frequency domain resource group includes the remaining mod(K/n) frequency domain resources. Or the frequency domain resource group is divided on a certain boundary, and the number of frequency domain resources included in the frequency domain resource group 0 and the frequency domain resource group N−1 is greater than or equal to 1 and less than or equal to [K/N], and the number of frequency domain resources included in other frequency domain resource groups is equal to [K/N].

Further, in the case of average grouping of frequency domain resources or in the case where the number of frequency domain resources included in part of frequency domain resource groups is the same, the frequency domain resources in the frequency domain resource group are continuous or non-continuous.

It should be noted that in the above embodiment, when the FDRA of PDSCH is type 0, RBG/PRG preferentially serves as a basic unit to correspond to different frequency domain resource groups, and when the FDRA of PDSCH is type 1, VRB preferentially serves as a basic unit to correspond to different frequency domain resource groups.

As an optional implementation manner, the FDRA information includes N pieces of information, and the N pieces of information are respectively used to indicate the N frequency domain resource groups, wherein the N pieces of information are N pieces of information in one FDRA field in the DCI, or the N pieces of information are N FDRA fields in the DCI; and the above-mentioned "indicate the N frequency domain resource groups" may be "indicate frequency domain resources of the N frequency domain resource groups", that is, frequency domain resources used by the frequency domain resource groups.

In this implementation manner, since N pieces of information are directly used to indicate N frequency domain resource groups respectively, the frequency domain resource allocation of each frequency domain resource group can be flexibly performed.

Optionally, the j-th information in the N pieces of information is used to indicate that part or all of the frequency domain resources in the j-th available frequency domain resource group are used as the frequency domain resource of the j-th frequency domain resource group; and part or all of the frequency domain resources included in an activated BWP may be divided into N available frequency domain resource groups, and j is any integer from 1 to N.

Further, part or all of the frequency domain resources included in the activated BWP may be divided into the N available frequency domain resource groups continuous or non-continuous manner according to a second proportion, wherein the second proportion may be a proportion which is as same as or different from the first proportion and is used to determine the number of frequency domain resources allocated to N available frequency domain resource groups from part or all of the frequency domain resources included in the activated BWP; part or all of frequency domain resources included in the activated BWP may be divided into the N available frequency domain resource groups in a continuous or non-continuous manner according to the second proportion, which may be referenced to the implementation manner that the K frequency domain resources are divided to the M frequency domain resource groups in a continuous or non-continuous manner according to the first proportion, so details are not elaborated herein.

In addition, the frequency domain resources of each available frequency domain resource group may be configured on the network side or agreed by a protocol.

In this implementation manner, N available frequency domain resource groups may be pre-configured, each available frequency domain resource group includes one or more available frequency domain resources, and the N available frequency domain resource groups are in one-to-one correspondence with the N frequency domain resource groups indicated by the DCI, so that when the DCI indicates the frequency domain resources of the N frequency domain resource groups, it is only necessary to indicate in the available frequency domain resources of the corresponding available frequency domain resource group, thereby saving the expense of the DCI.

Take RBGs corresponding to one frequency domain resource group sequentially in turn or dividing all RBGs in the BWP into n segments as an example.

Assuming that there are 12 RBGs (RBG0, 1, 2, . . . , 11) in total on a BWP, it is necessary to be divided into a total of N=2 available frequency domain resource groups. In a case that the default method is used: RBGs correspond to one available frequency domain resource group sequentially in turn, RBG0, 2, 4, 6, 8, 10 correspond to the first available frequency domain resource group, and RBG1, 3, 5, 7, 9, 11 correspond to the second available frequency domain resource group.

In this way, when FDRA is type 0, the first FDRA field of DCI may indicate the RBG number used by the first frequency domain resource group by 6 bits (for example, 100110 indicates the use of RBG0, 6, 8), and the second FDRA field may also indicate the RBG number used by the second frequency domain group by 6 bits (for example, 100110 indicates the use of RBG1, 7, 9). At this time, the total number of bits in the two FDRA fields is equal to the number of bits in the original FDRA information.

When FDRA is type 1, the resource indication value (RIV) included in the j-th FDRA field of DCI is $\lceil \log_2 [K'_j(K'_j+1)/2] \rceil$ bits to indicate the start number and length of VRB used by the n-th frequency domain resource group, wherein $K'_j$ is the number of part of RBGs which can be used by the j-th frequency domain resource group.

As an optional implementation manner, in a case that a precoding granularity is configured as wideband, the communication device expects any piece of spatial information to indicate that the corresponding frequency domain resource group is a continuous frequency domain resource and assumes that any piece of spatial information indicates that the frequency domain resources of the corresponding frequency domain resource group uses the same precoding.

In this implementation manner, for the terminal, in a case that the precoding granularity is determined to be "wideband", the terminal does not expect that the corresponding frequency domain resource group indicated by any piece of spatial information is scheduled as a non-continuous frequency domain resource (for example: PRB), and the terminal may assume that the corresponding frequency domain resource group indicated by any piece of spatial information uses the same precoding.

In this implementation manner, for the network device, in a case that the precoding granularity is determined to be "wideband", the network device configures the frequency domain resource group indicated by any piece of spatial information to be scheduled as a continuous frequency domain resource (for example: PRB), and the network device uses the same precoding corresponding to the frequency domain resource group indicated by any piece of spatial information.

Since it is expected that any piece of spatial information indicates that the corresponding frequency domain resource group is a continuous frequency domain resource, and it is assumed that any piece of spatial information indicates that the frequency domain resources of the corresponding frequency domain resource group use the same precoding, so that the transmission complexity of the PDSCH by the communication device can be reduced.

In the embodiment of the present disclosure, DCI is transmitted, wherein the DCI includes frequency domain resource allocation (FDRA) information, the FDRA information is used to determine N frequency domain resource groups, the N frequency domain resource groups are N groups of frequency domain resources used by the communication device for a physical downlink shared channel (PDSCH) transmission, the N frequency domain resource groups respectively correspond to N spatial information indications, and N is an integer which is greater than or equal to 2. In this way, N groups of frequency domain resources can be configured, thereby avoiding PDSCH transmission conflicts.

Figure 3:
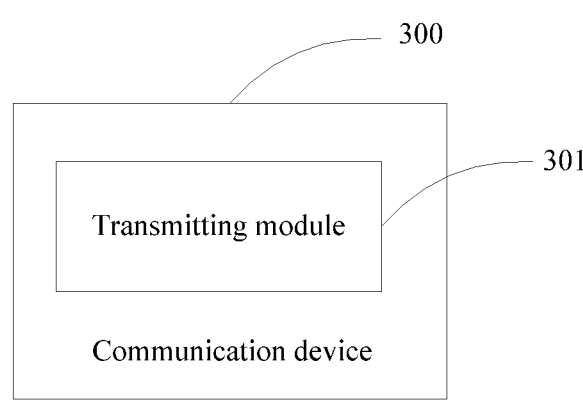
FIG. 3 is a structural diagram of a communication device according to an embodiment of the present invention.

Referring to FIG. 3, it is a structural diagram of a communication device according to an embodiment of the present disclosure. As shown in FIG. 3, the communication device 300 includes:

a transmission module 301, configured to transmit DCI, wherein the DCI includes FDRA information, the FDRA information is used to determine N frequency domain resource groups, the N frequency domain resource groups are N groups of frequency domain resources used by the communication device for a PDSCH transmission, the N frequency domain resource groups respectively correspond to N spatial information indications, and N is an integer which is greater than or equal to 2.

Optionally, the FDRA information is one FDRA field and indicates K frequency domain resources; the K frequency domain resources are divided into M frequency domain resource groups; and K is an integer which is greater than or equal to N, and M is an integer which is greater than or equal to 1 and which is less than or equal to N.

Optionally, the K frequency domain resources are divided into the M frequency domain resource groups in a continuous or non-continuous manner according to a first proportion.

Optionally, when M is less than N, the frequency domain resources of the remaining N−M frequency domain resource groups are determined according to the frequency domain resources and configuration information of the M frequency domain resource groups indicated by the FDRA information.

Optionally, the configuration information is used to configure an offset between frequency domain resource groups, and the configuration information is configured on a network side or agreed by a protocol.

Optionally, the FDRA information includes N pieces of information, and the N pieces of information are respectively used to indicate the N frequency domain resource groups, wherein the N pieces of information are N pieces of information in one FDRA field in the DCI, or the N pieces of information are N FDRA fields in the DCI; and Optionally, the j-th information in the N pieces of information is used to indicate that part or all of the frequency domain resources in the j-th available frequency domain resource group are used as the frequency domain resource of the j-th frequency domain resource group, wherein part or all of the frequency domain resources included in an activated bandwidth part (BWP) are divided into N available frequency domain resource groups, and j is any integer from 1 to N.

Optionally, the frequency domain resources of each available frequency domain resource group is configured on the network side or agreed by a protocol.

Optionally, part or all of the frequency domain resources included in the activated BWP are divided into the N available frequency domain resource groups continuous or non-continuous manner according to a second proportion, Optionally, in a case that a precoding granularity is configured as wideband, the communication device expects any piece of spatial information to indicate that the corresponding frequency domain resource group is a continuous frequency domain resource and assumes that any piece of spatial information indicates that the frequency domain resources of the corresponding frequency domain resource group uses the same precoding.

The communication device provided by the embodiment of the present disclosure can implement each process implemented by the communication device in the method embodiment in FIG. 2. To avoid repetition, details are not elaborated herein. multi-TRP transmission in the FDM mode may be supported.

Figure 4:
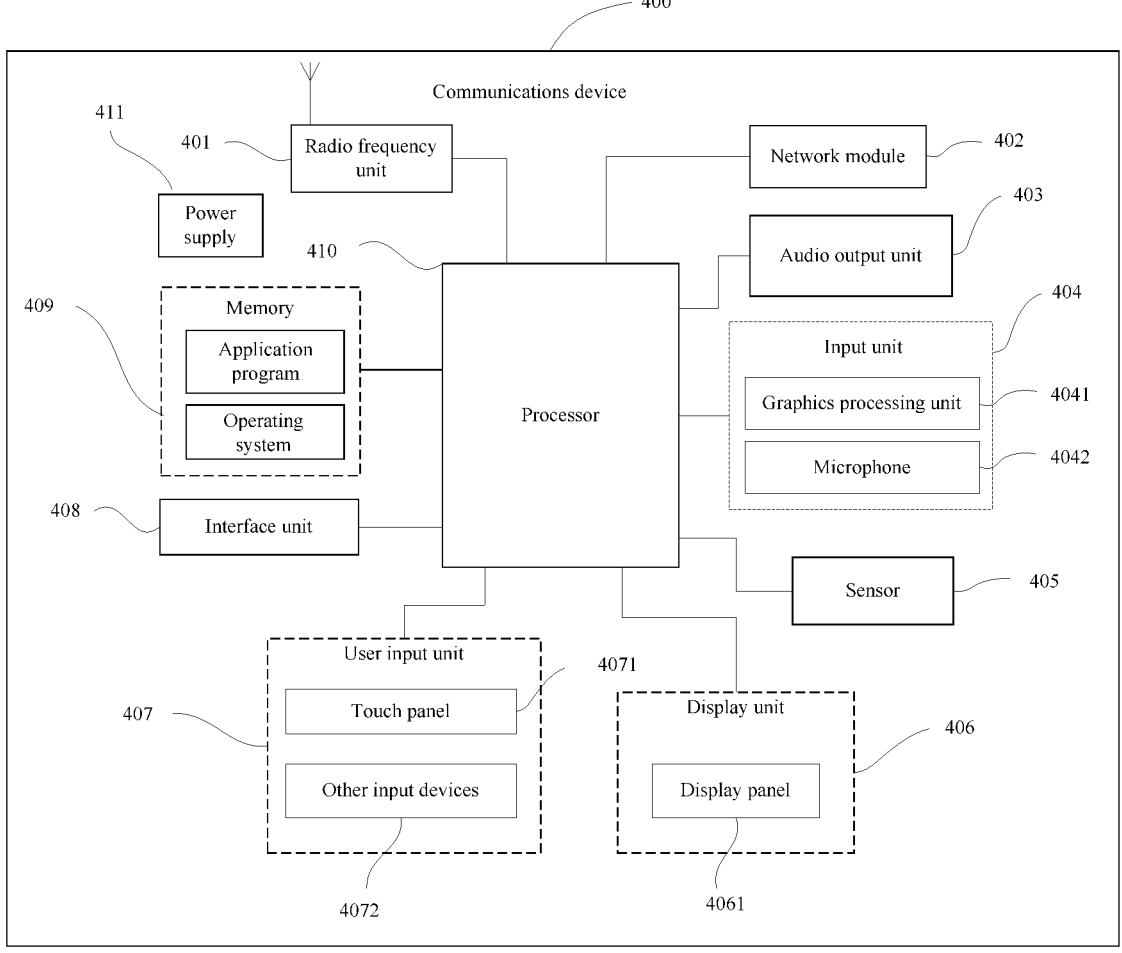
FIG. 4 is a structural diagram of another communication device according to an embodiment of the present invention.

FIG. 4 is a schematic diagram of a hardware structure of a communication device for implementing the embodiments of the present disclosure. The structural diagram of the communication device in this embodiment is illustrated by the structural diagram of the terminal.

The communication device 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. Those skilled in the art may understand that the terminal structure shown in FIG. 4 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a notebook computer, a palmtop computer, an in-vehicle terminal, a robot, a wearable device, a pedometer, and the like.

A transmission module 401 is configured to transmit DCI, wherein the DCI includes FDRA information, the FDRA information is used to determine N frequency domain resource groups, the N frequency domain resource groups are N groups of frequency domain resources used by the communication device for a PDSCH transmission, the N frequency domain resource groups respectively correspond to N spatial information indications, and N is an integer which is greater than or equal to 2.

Optionally, the FDRA information is one FDRA field and indicates K frequency domain resources; the K frequency domain resources are divided into M frequency domain resource groups; and K is an integer which is greater than or equal to N, and M is an integer which is greater than or equal to 1 and which is less than or equal to N.

Optionally, the K frequency domain resources are divided into the M frequency domain resource groups in a continuous or non-continuous manner according to a first proportion.

Optionally, when M is less than N, the frequency domain resources of the remaining N−M frequency domain resource groups are determined according to the frequency domain resources and configuration information of the M frequency domain resource groups indicated by the FDRA information.

Optionally, the configuration information is used to configure an offset between frequency domain resource groups, and the configuration information is configured on a network side or agreed by a protocol.

Optionally, the FDRA information includes N pieces of information, and the N pieces of information are respectively used to indicate the N frequency domain resource groups, wherein the N pieces of information are N pieces of information in one FDRA field in the DCI, or the N pieces of information are N FDRA fields in the DCI; and Optionally, the j-th information in the N pieces of information is used to indicate that part or all of the frequency domain resources in the j-th available frequency domain resource group are used as the frequency domain resource of the j-th frequency domain resource group, wherein part or all of the frequency domain resources included in an activated bandwidth part (BWP) are divided into N available frequency domain resource groups, and j is any integer from 1 to N.

Optionally, the frequency domain resources of each available frequency domain resource group is configured on the network side or agreed by a protocol.

Optionally, part or all of the frequency domain resources included in the activated BWP are divided into the N available frequency domain resource groups continuous or non-continuous manner according to a second proportion, Optionally, in a case that a precoding granularity is configured as wideband, the communication device expects any piece of spatial information to indicate that the corresponding frequency domain resource group is a continuous frequency domain resource and assumes that any piece of spatial information indicates that the frequency domain resources of the corresponding frequency domain resource group uses the same precoding.

The communication device can support multi-TRP transmission in the FDM mode.

It should be understood that, in this embodiment of the present disclosure, the radio frequency unit 401 may be configured to receive and transmit information, or receive and transmit signals during a call. Specifically, the radio frequency unit 401 receives downlink data from a base station, and transmits the downlink data to the processor 410 for processing; and in addition, transmits uplink data to the base station. Generally, the radio frequency unit 401 includes, but is not limited to, an antenna, at least one amplifier, a transceiver, a coupler, a low noise amplifier, and a duplexer, and the like. In addition, the radio frequency unit 401 may further communicate with a network and other devices through a wireless communications system.

The terminal provides a user with wireless broadband Internet access by using the network module 402, for example, helping the user send and receive emails, browse web pages, and access streaming media.

The audio output unit 403 may convert audio data received by the radio frequency unit 401 or the network module 402 or stored in the memory 409 into an audio signal, and output the audio signal into a sound. Moreover, the audio output unit 403 may further provide audio output related to a specific function performed by the terminal 400 (such as a call signal reception sound, a message reception sound, or the like). The audio output unit 403 includes a speaker, a buzzer, a telephone receiver, and the like.

The input unit 404 is configured to receive audio or video signals. The input unit 404 may include a graphics processing unit (GPU) 4041 and a microphone 4042. The graphics processing unit 4041 processes image data of a static picture or a video obtained by an image capture apparatus (for example, a camera) in a video capture mode or image capture mode. A processed image frame can be displayed on the display unit 406. The image frame processed by the graphics processing unit 4041 may be stored in the memory 409 (or another storage medium) or transmitted via the radio frequency unit 401 or the network module 402. The microphone 4042 may receive a sound and can process such sound into audio data. The processed audio data may be converted, in a call mode, into a format that may be transmitted to a mobile communication base station by using the radio frequency unit 401 for output.

The terminal 400 further includes at least one sensor 405, such as a light sensor, a motion sensor and another sensor. Specifically, the light sensor includes an ambient light sensor and a proximity sensor. The ambient light sensor can adjust a brightness of a display panel 4061 based on a brightness of ambient light. The proximity sensor can close the display panel 4061 and/or backlight when the terminal 400 moves to an ear. As a type of the motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein again.

The display unit 406 is configured to display information input by a user or information provided to a user. The display unit 406 may include a display panel 4061, and the display panel 4061 may be configured in a form of a liquid crystal display (LCD), an organic light-emitting diode (OLED), or the like.

The user input unit 407 may be configured to receive input digital or character information, and generate key signal input related to user setting and function control of a terminal. In particular, the user input unit 407 includes a touch panel 4071 and other input devices 4072. The touch panel 4071 is also referred to as a touchscreen, and may collect a touch operation performed by a user on or near the touch panel 4071 (such as an operation performed by a user on the touch panel 4071 or near the touch panel 4071 by using any proper object or accessory, such as a finger or a stylus). The touch panel 4071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 410, and receives and executes a command from the processor 410. In addition, the touch panel 4071 may be implemented by various types such as a resistive type, a capacitive type, an infrared ray type or a surface acoustic wave type. In addition to the touch panel 4071, the user input unit 407 may further include another input device 4072. Specifically, the other input devices 4072 may include but are not limited to: a physical keyboard, a function key (such as a volume control key, a switch key), a trackball, a mouse, and a joystick, which is no longer repeated herein.

Further, the touch panel 4071 may cover the display panel 4061. When detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. Although in FIG. 4, the touch panel 4071 and the display panel 4061 are used as two independent components to implement input and output functions of the terminal, in some embodiments, the touch panel 4071 and the display panel 4061 may be integrated to implement the input and output functions of the mobile terminal. This is not specifically limited herein.

The interface unit 408 is an interface for connecting an external apparatus to the terminal 400. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 408 may be configured to receive input (for example, data information and power) from an external apparatus and transmit the received input to one or more elements within the terminal 400, or may be configured to transmit data between the terminal 400 and the external apparatus.

The memory 409 may be configured to store software programs and various data. The memory 409 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 409 may include a high-speed random access memory, or may include a nonvolatile memory, for example, at least one disk storage device, a flash memory, or another volatile solid-state storage device.

The processor 410 is a control center of the terminal. The processor 410 uses various interfaces and lines to connect the various parts of the entire terminal, and performs various functions of the terminal and processes data by running or executing software programs and/or modules stored in the memory 409 and invoking data stored in the memory 409, to monitor the terminal as a whole. The processor 410 may include one or more processing units. Optionally, the processor 410 may be integrated with an application processor and a modem processor. The application processor mainly processes an operating system, a user interface, an application program, and the like, and the modem processor mainly processes wireless communication. It may be understood that alternatively, the modem processor may not be integrated into the processor 410.

The terminal 400 may further include the power supply 411 (for example, a battery) configured to supply power to various components. Optionally, the power supply 411 may be logically connected to the processor 410 through a power management system, so as to implement functions such as managing charging, discharging, and power consumption through the power management system.

In addition, the terminal 400 includes some function modules that are not shown, which are not elaborated herein.

Optionally, an embodiment of the present disclosure further provides a terminal, including a processor 410, a memory 409, and a computer program that is stored in the memory 409 and that can run on the processor 410. When the computer program is executed DCI processor 410, the processes of the DCI transmission method embodiment are implemented and a same technical effect can be achieved. To avoid repetition, details are not described herein again.

An embodiment of this disclosure further provide a computer-readable storage medium. The computer-readable storage medium stores a computer program, and when the computer program is executed by a processor, the DCI transmission method provided in the embodiments of this disclosure are implemented, and the same technical effect can be achieved. To avoid repetition, details are not described herein again. The computer readable storage medium is a read-only memory (ROM), a random access memory (RAM), a magnetic disk, an optical disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A method for downlink control information (DCI) transmission, applied to a communication device and comprising:

performing a transmission of DCI, wherein the DCI comprises frequency domain resource allocation (FDRA) information, the FDRA information indicates K frequency domain resources, the K frequency domain resources are divided into N frequency domain resource groups according to a first proportion, the first proportion is an even distribution, the N frequency domain resource groups are N groups of frequency domain resources used by the communication device for a physical downlink shared channel (PDSCH) transmission, the N frequency domain resource groups respectively correspond to N spatial information indications, the spatial information indications comprise transmission configuration indicator (TCI) states, and N is an integer which is greater than or equal to 2;
wherein the K frequency domain resources are divided into N frequency domain resource groups by PRG as a basis unit, the precoding resource block group (PRG) corresponds to N frequency domain resource groups sequentially in turn;

wherein even PRGs in the K frequency domain resources are divided into a first frequency domain resource group, odd PRGs in the K frequency domain resources are divided into a second frequency domain resource group.

2. The method according to claim 1, wherein the K frequency domain resources are divided into the N frequency domain resource groups in a continuous manner according to the first proportion.

3. The method according to claim 2, wherein the K frequency domain resources are averagely allocated to N frequency domain resource groups, the continuous K/N frequency domain resources are divided into one frequency domain resource group.

4. A communication device, comprising: a memory, a processor, and a program stored in the memory and capable of running on the processor, wherein the program is executed by the processor to implement:

performing a transmission of downlink control information (DCI), wherein the DCI comprises frequency domain resource allocation (FDRA) information, the FDRA information indicates K frequency domain resources, the K frequency domain resources are divided into N frequency domain resource groups according to a first proportion, the first proportion is an even distribution, the N frequency domain resource groups are N groups of frequency domain resources used by the communication device for a physical downlink shared channel (PDSCH) transmission, the N frequency domain resource groups respectively correspond to N spatial information indications, the spatial information indications comprise transmission configuration indicator (TCI) states, and N is an integer which is greater than or equal to 2; wherein the K frequency domain resources are divided into N frequency domain resource groups by PRG precoding resource block group (PRG) as a basis unit, the PRG corresponds to N frequency domain resource groups sequentially in turn;

wherein even PRGs in the K frequency domain resources are divided into a first frequency domain resource group, odd PRGs in the K frequency domain resources are divided into a second frequency domain resource group.

5. The communication device according to claim 4, wherein the K frequency domain resources are divided into the N frequency domain resource groups in a continuous manner according to the first proportion.

6. The communication device according to claim 5, wherein the K frequency domain resources are averagely allocated to N frequency domain resource groups, the continuous K/N frequency domain resources are divided into one frequency domain resource group.

7. A non-transitory computer readable storage medium, storing a computer program, wherein the computer program is executed by a processor to implement:

performing a transmission of downlink control information (DCI), wherein the DCI comprises frequency domain resource allocation (FDRA) information, the FDRA information indicates K frequency domain resources, the K frequency domain resources are divided into N frequency domain resource groups according to a first proportion, the first proportion is an even distribution, the N frequency domain resource groups are N groups of frequency domain resources used by the communication device for a physical downlink shared channel (PDSCH) transmission, the N frequency domain resource groups respectively correspond to N spatial information indications, the spatial information indications comprise transmission configuration indicator (TCI) states, and N is an integer which is greater than or equal to 2; wherein the K frequency domain resources are divided into N frequency domain resource groups by precoding resource block group (PRG) as a basis unit, the PRG corresponds to N frequency domain resource groups sequentially in turn;

wherein even PRGs in the K frequency domain resources are divided into a first frequency domain resource group, odd PRGs in the K frequency domain resources are divided into a second frequency domain resource group.

* * * * *